United States Patent [19]

Perilloux, Jr.

[11] Patent Number: 4,549,455
[45] Date of Patent: Oct. 29, 1985

[54] COMBINATION TABLE SAW

[76] Inventor: Milton Perilloux, Jr., 680 N. Seventh St., Ponchatoula, La. 70454

[21] Appl. No.: 482,763

[22] Filed: Apr. 7, 1983

Related U.S. Application Data

[63] Continuation-in-part of Ser. No. 326,578, Dec. 2, 1981, abandoned, which is a continuation-in-part of Ser. No. 138,288, Apr. 8, 1980, abandoned.

[51] Int. Cl.⁴ ............................................... B27B 5/20
[52] U.S. Cl. ................................. 83/477.2; 83/471.2; 83/488
[58] Field of Search ............... 83/471.2, 477.2, 488, 83/438, 487

[56] References Cited

U.S. PATENT DOCUMENTS

| | | | |
|---|---|---|---|
| 1,813,435 | 7/1931 | Bentz | 83/471.2 |
| 1,813,783 | 7/1931 | Tomlinson et al. | 83/471.2 |
| 2,247,314 | 6/1941 | Sellmeyer | 83/471.2 |
| 2,729,250 | 1/1956 | Gilkey | 83/477.2 |
| 2,870,802 | 1/1959 | Richards | 83/471.2 |
| 2,933,113 | 4/1960 | Meyer | 83/471.2 |
| 3,456,697 | 7/1969 | Rutzebeck | 83/471.2 |
| 4,068,550 | 1/1978 | Gray et al. | 83/471.2 |

*Primary Examiner*—Donald R. Schran
*Attorney, Agent, or Firm*—Biebel, French & Nauman

[57] ABSTRACT

An improved saw and saw table combination is provided having a unique movable saw carriage and tracking assembly and a unique table top miter-rip fence assembly, all of which allow cross-cutting, mitering or ripping of both small and large pieces or sheets of wood.

6 Claims, 13 Drawing Figures

COMBINATION TABLE SAW

RELATED APPLICATIONS

This is a continuation-in-part application of U.S. patent application Ser. No. 326,578, filed Dec. 2, 1981, by the inventor herein and entitled "Combination Table Saw", now abandoned, which application is a continuation-in-part of U.S. patent application Ser. No. 138,288, filed by the inventor herein on Apr. 8, 1980, and entitled "The Combination Table Saw", now abandoned, specific mention of which is being made to obtain benefit of the filing dates thereof.

BACKGROUND OF THE INVENTION

1. Field of the Invention

This invention relates in general to table saws.

2. Prior Art

There have been a multitude of table saw designs such as is seen in the following U.S. Patents.

| U.S. Pat. No. | INVENTOR | ISSUED | TITLE |
| --- | --- | --- | --- |
| 1,813,783 | Tomlinson, et al | 07/07/31 | "Saw Table" |
| 2,247,314 | Sellmeyer | 06/24/41 | "Portable Power Saw" |
| 2,729,250 | Gilkey | 01/03/56 | "Portable Saw Table Containing Sliding Portion" |
| 2,870,802 | Richards | 01/27/59 | "Under-Table Traveling-Saw Apparatus For Cutting Sheet of Materials" |
| 2,933,113 | Meyer | 04/19/60 | "Combo-Trolley-Bench" |
| 3,456,697 | Rutzebeck | 07/22/69 | "Traveling Arbor Saw" |
| 4,068,550 | Gray, et al | 01/17/78 | "Foldable Bench For A Portable Hand-Held Circular Saw" |

However, the difficulty with these and other prior art saw table designs has been their lack of versatility; i.e., inability to handle large pieces of lumber, inability to perform cross-cutting, mitering and ripping operations. An additional difficulty with these prior art saw table designs is that, with each, the carriage and track cannot be extended past the edge of the table top.

SUMMARY OF THE INVENTION

Therefore, it is an object of this invention to provide a table saw which can easily cross-cut, miter or rip small lumber strips as well as large lumber sheets without the need for extraneous extension structures.

Another object of this invention is to provide a table saw that is safe to operate and can quickly be converted from one type of sawing operation to another.

Still another object of this invention is to provide a table saw that can accurately cross-cut, miter or rip a piece of lumber.

Other objects and advantages of this invention shall become apparent from the ensuing descriptions of the invention.

Accordingly, a table saw is provided comprising a circular power driven saw fixedly mounted on a carriage assembly attached to a track assembly in a manner to allow lengthwise movement of the carriage assembly on the track assembly, the track assembly being attached to a frame structure to allow movement of the track assembly on the frame which is parallel to the carriage movement, a miter-rip fence variably positionable on a table top attached to the top of the frame structure, the fence having attaching means allowing fixed attachment of the fence to the table top in a desired position, and the table top having a channel for the blade of the saw to extend through.

DETAILED DESCRIPTION OF THE PREFERRED EMBODIMENT

Figure 1:
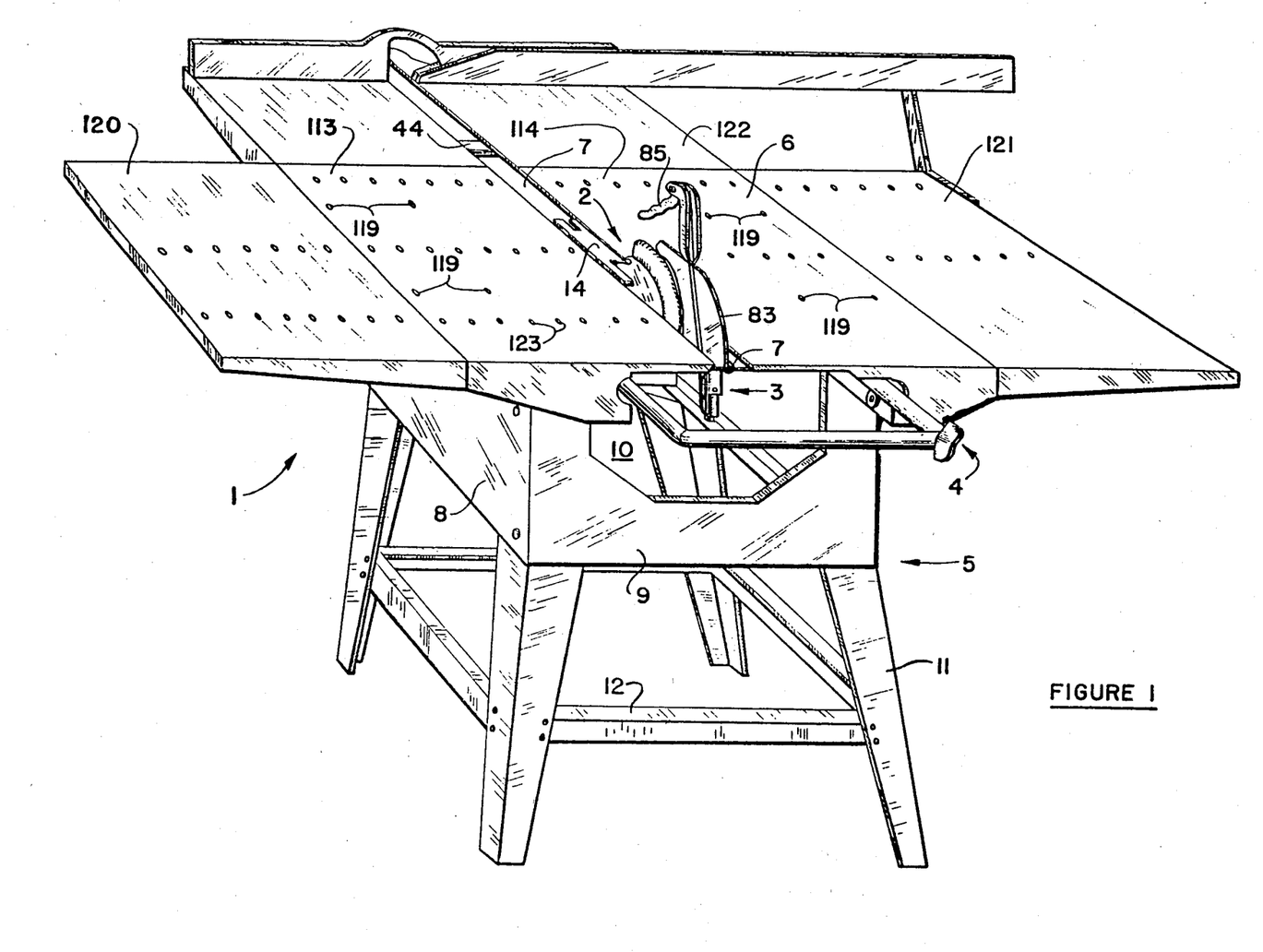
FIG. 1 is a perspective view of a table saw of this invention.

Referring now to the figures, and particularly FIG. 1, a preferred embodiment of the combination saw is illustrated comprising, in general, a circular power driven saw 2 fixedly mounted on a carriage assembly 3, a track assembly 4 mounted for horizontal movement to a frame structure 5, and an extendable table top 6 attached to frame structure 5 and having a channel 7 through which saw 2 protrudes.

In this embodiment, frame structure 5 is constructed with an upper box shaped structure having parallel side walls 8 and parallel end walls 9 welded or bolted together to form a rigid frame on top of which table top 6 can be attached. End walls 9 are cut away to form a passageway 10 for track assembly 4 and saw 2 to pass during ripping operations described below. If the combination saw is not a table model, then legs 11 are bolted or welded to the frame walls 8 and 9 as shown to raise the table top to the desired work level. For additional support, cross-members 12 are fixedly attached to legs 11 as shown.

In FIGS. 2-6, carriage assembly 3 and track assembly 4 are illustrated. Carriage assembly 3 comprises a saw mounting frame having a material support guide 14 fixedly mounted by screws 15 to the front end of frame 13 as shown, which material support guide 14 is shaped and positioned to slidingly fit in table top channel 7 (FIG. 1). Frame 13 is further provided with four roller assemblies 16, which are attached at the four corners of frame 13. Each assembly 16 has a mounting plate 17 fixedly attached to the underside of frame 13 by screws 18 as shown. Each plate 17 has a roller axle 19 extending below and outward from plate 17 on which rollers 20 are rotatably mounted and held in position by screws 21. Frame 13 is also provided with tabs 22, which protrude downward and have threaded opening 23 through which threaded axle 24 rotatably positions upper track rollers 25. Each roller 20 and 24 is properly positioned to rest on the underside of track side bars 26 of track assembly 4 (see FIG. 4), so that carriage assembly 3 can be horizontally moved back and forth on track side bars 26.

Frame 13 is provided with a lower shoulder piece 27 having an opening 28 through which pin 29 can extend into track side bar opening 30 to lock frame 13 in fixed position relative to track side bar 26. Spring 31 is mounted on pin 29 and exerts a force against both lower shoulder piece 27 and pin plate 32 so that when pin tip 33 is aligned with track side bar opening 30, pin tip 33 will enter opening 30, thus locking carriage assembly 3 in place relative to track assembly 4.

Figure 2:
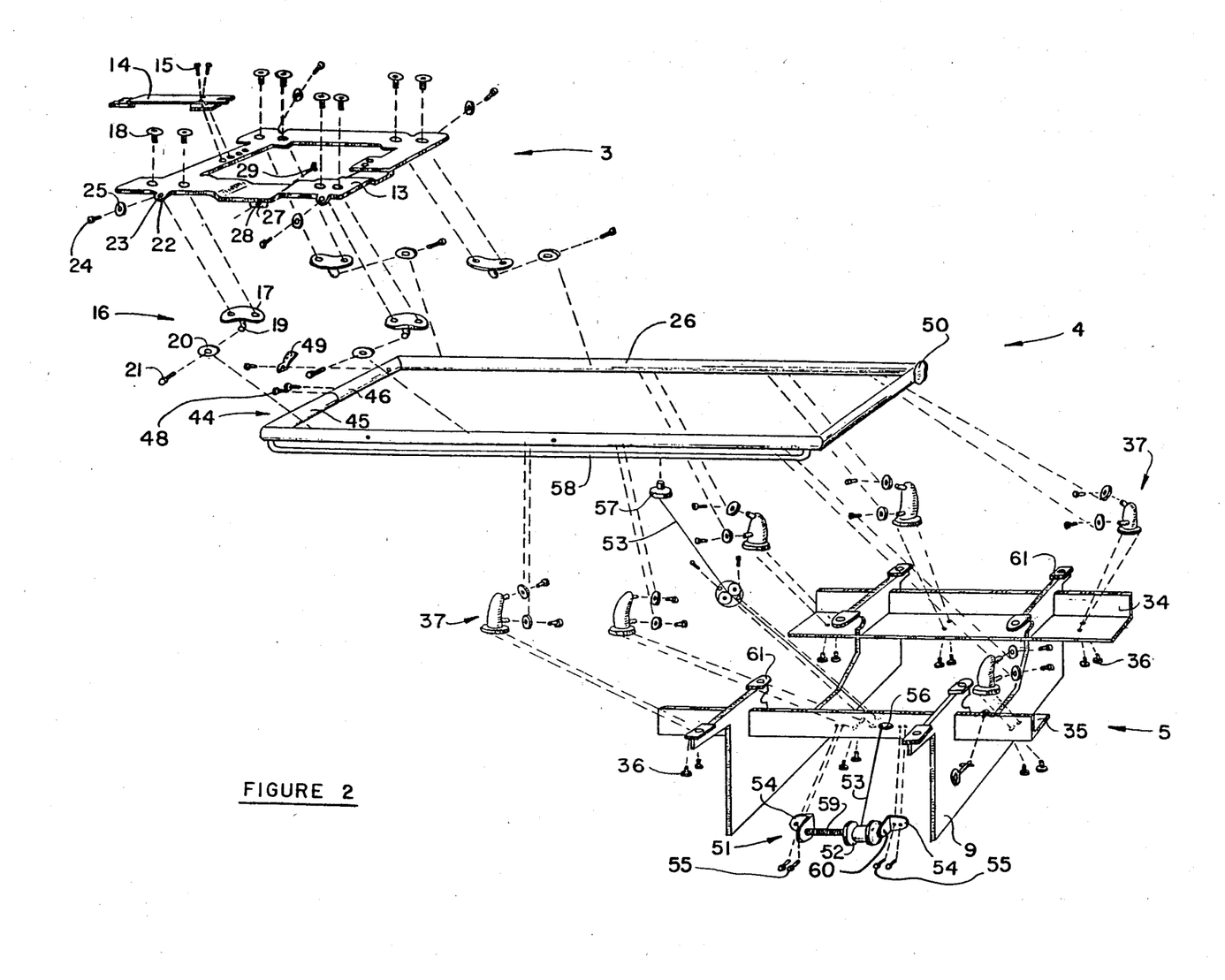
FIG. 2 is an exploded, perspective view of the table structure having track guide rollers, the track assembly and the carriage assembly.
Figure 3:
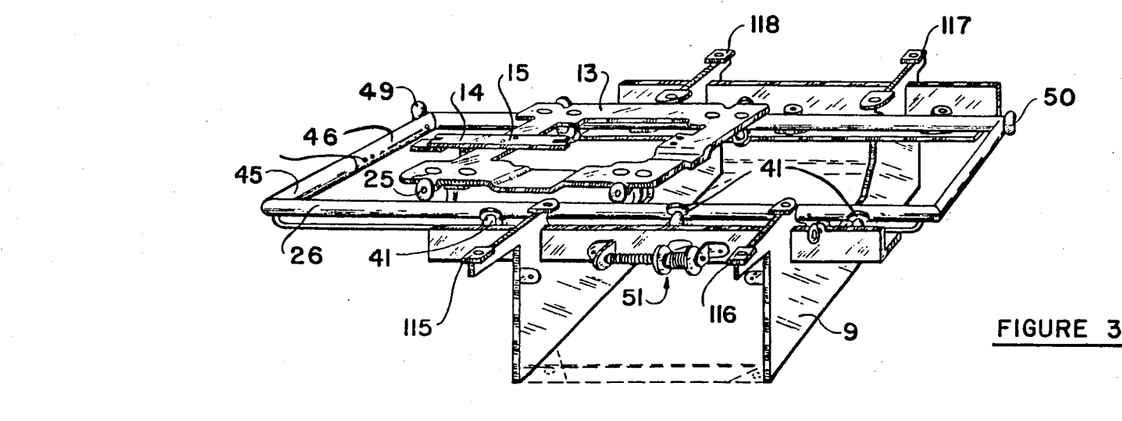
FIG. 3 is a perspective view of the track and carriage assemblies mounted on the frame structure.
Figure 4:
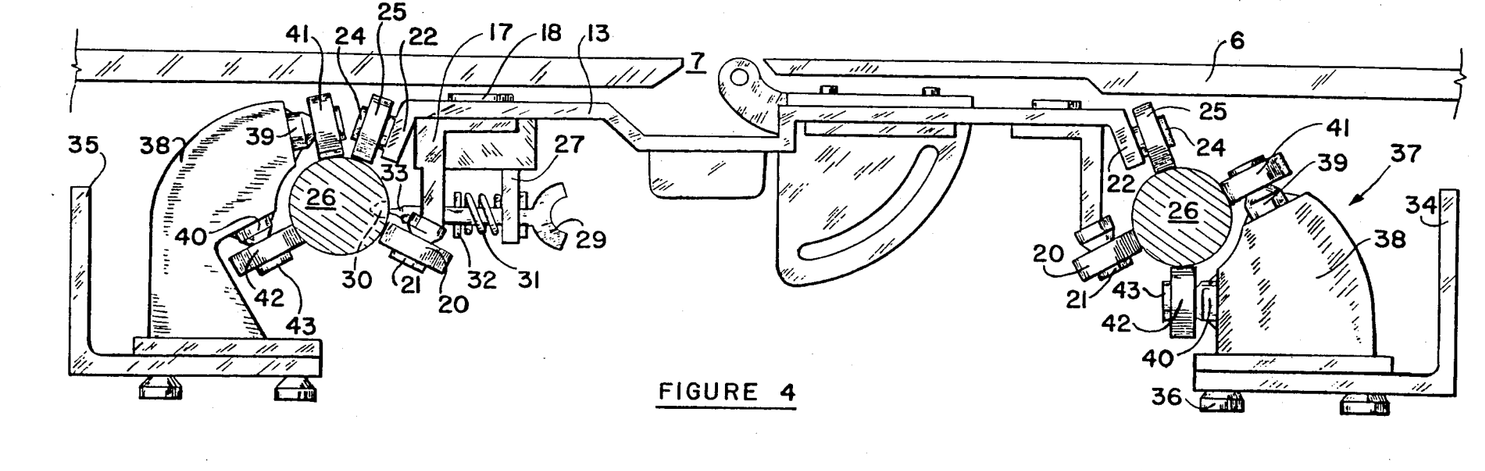
FIG. 4 is a front view of the carriage assembly mounted on the track assembly and frame structure.

To slidingly mount track assembly 4 on frame structure 5, frame end walls 9 are provided with L-shaped opposing pieces 34 and 35, to which are mounted, by screws 36, six track roller assemblies 37, three on each piece. Preferably, one track piece 34 is mounted on each end and one in the middle, as shown in FIG. 2. Pieces 34 and 35 have slotted holes so roller assemblies 37 can be moved to assist in aligning the carriage assembly 3 and track assembly 7 on frame 13 to allow the material rest shoe 14 to easily pass through channel 7. Each assembly 37 comprises a roller mounting bracket 38 having an upper axle 39 and a lower axle 40 to which is rotatably mounted upper roller 41 and lower roller 42, which are held in position thereon by screws 43. Rollers 41 and 42 are positioned to contact track side bar 26, as shown more clearly in FIG. 4. In this manner, rollers 20, 25, 41 and 42 form a fixed path in which track side bar 26 can horizontally move.

Figure 6:
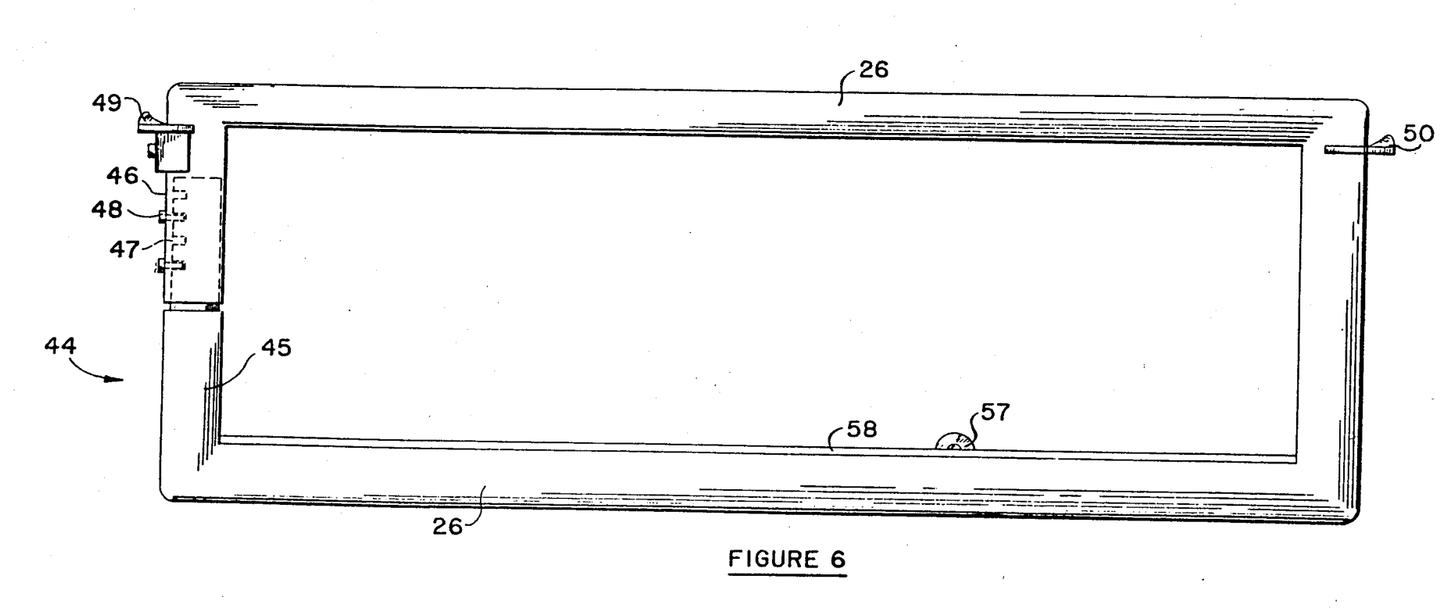
FIG. 6 is a top view of the track with centering means and carriage assembly mounted on track assembly preferred in this invention.

As shown in FIGS. 2 and 6, front bar 44 is constructed of tubular members 45 and 46, which telescope into one another. Members 45 and 46 are provided with multiple threaded openings 47 (FIG. 6), which can be aligned with one another to allow adjustment of the width of front bar 44. This insures that track side bars 26 will properly fit in the path formed by rollers 20, 25, 41 and 42. Once the proper width is obtained, screws 48 are positioned in openings 47 to fix the position of members 45 and 46 relative to one another.

As shown in FIGS. 2, 3, 5 and 6, track assembly 4 is provided with front and rear carriage assembly stops 49 and 50 to prevent track assembly 4 from being pushed or pulled out of the frame structure 5.

Figure 5:
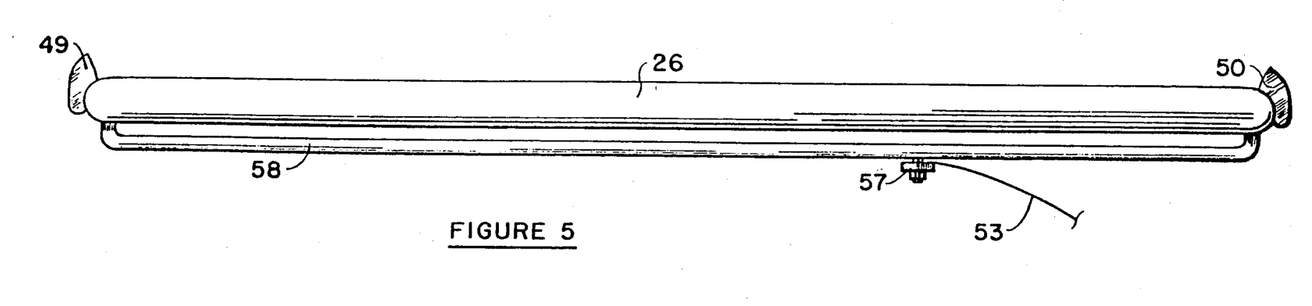
FIG. 5 is a side view of the track with centering means preferred in this invention.

Track assembly 4 is provided with an automatic repositioning assembly 51, which comprises a spring-loaded spool 52 of line 53 mounted by brackets 54 which are fixed by screws 55 to L-shaped piece 35. Line 53 extends from spool 52 through opening 56 of piece 35 and attaches to bearing 57 which attaches to the bottom of rail 58 that is attached to track side bar 26, as shown in FIGS. 2 and 5. Spring 59 is attached at one end to axle 60 and at its other end to spool 52, so that as line 53 is unwound, spring 59 is twisted and will uncoil, turning spool 52 when track side bar 26 is released.

Finally, as seen in FIG. 2, frame end wall 9 is provided with table top mountings 61 to which table top 6 can be bolted as described hereinbelow.

Figure 7:
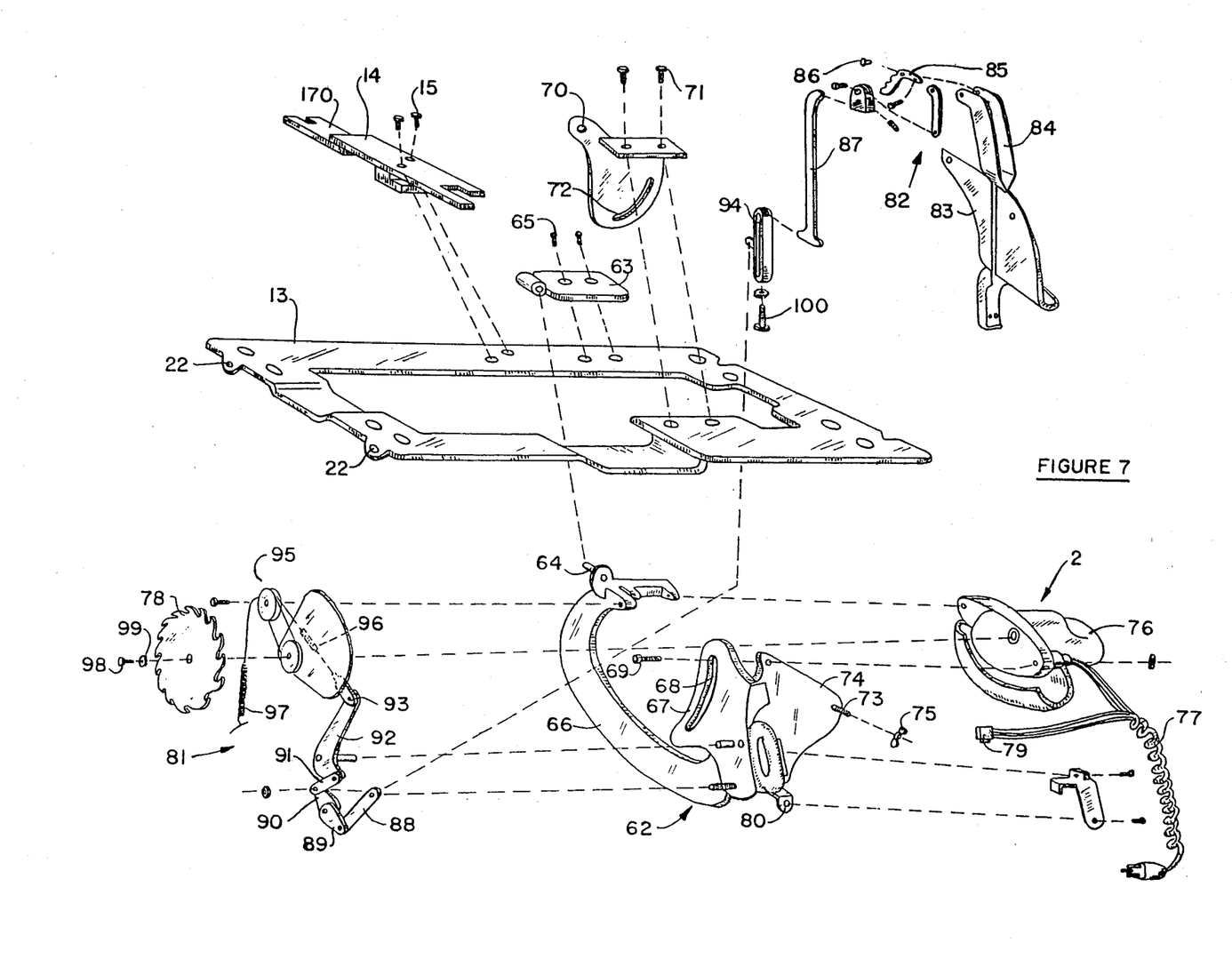
FIG. 7 is an exploded, perspective view of the saw, saw mounting assembly and saw control assembly.
Figure 8:
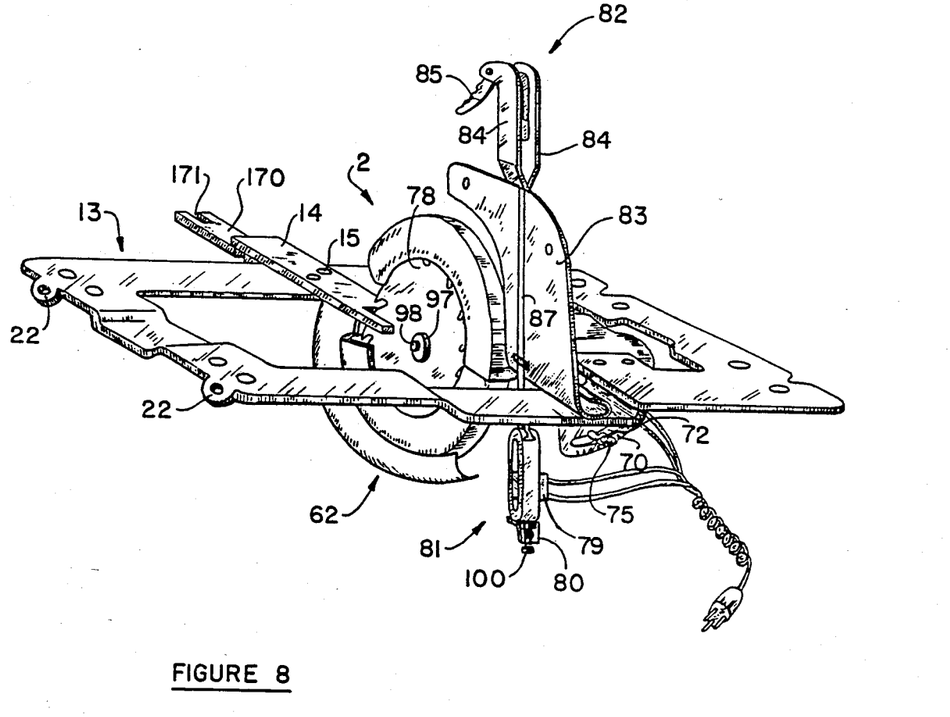
FIG. 8 is a perspective view of the saw and saw mounting and saw control assemblies positioned on the carriage assembly.

Turning now to FIGS. 7 and 8, structure for mounting circular saw 2 to saw mounting frame 13 is shown. Saw 2 is attached to mounting bracket 62, which, in turn is pinned to hinge 63, by bracket pin 64, wherein hinge 63 is fixedly attached to brackets 13 by bolts 65.

Bracket 62 comprises arcuate section 66, which is perpendicular to table top 6 and having a parallel vertical height saw adjusting member 67, with arcuate slot 68 through which saw height positioning pin 69 passes. Blade tilt indicator bracket 70 is attached to frame 13 by bolts 71 and is provided with arcuate slot 72 through which angle indicator threaded pin 73 perpendicularly protruding from plate 74 of bracket 62 passes. Saw 2 is then held in the desired tilting position by tightening wing nut 75 on pin 73.

Saw motor 76 is provided with electrical cord 77, which plugs into a power source and a switch 79 attached to the rear of the carriage.

Figure 11:
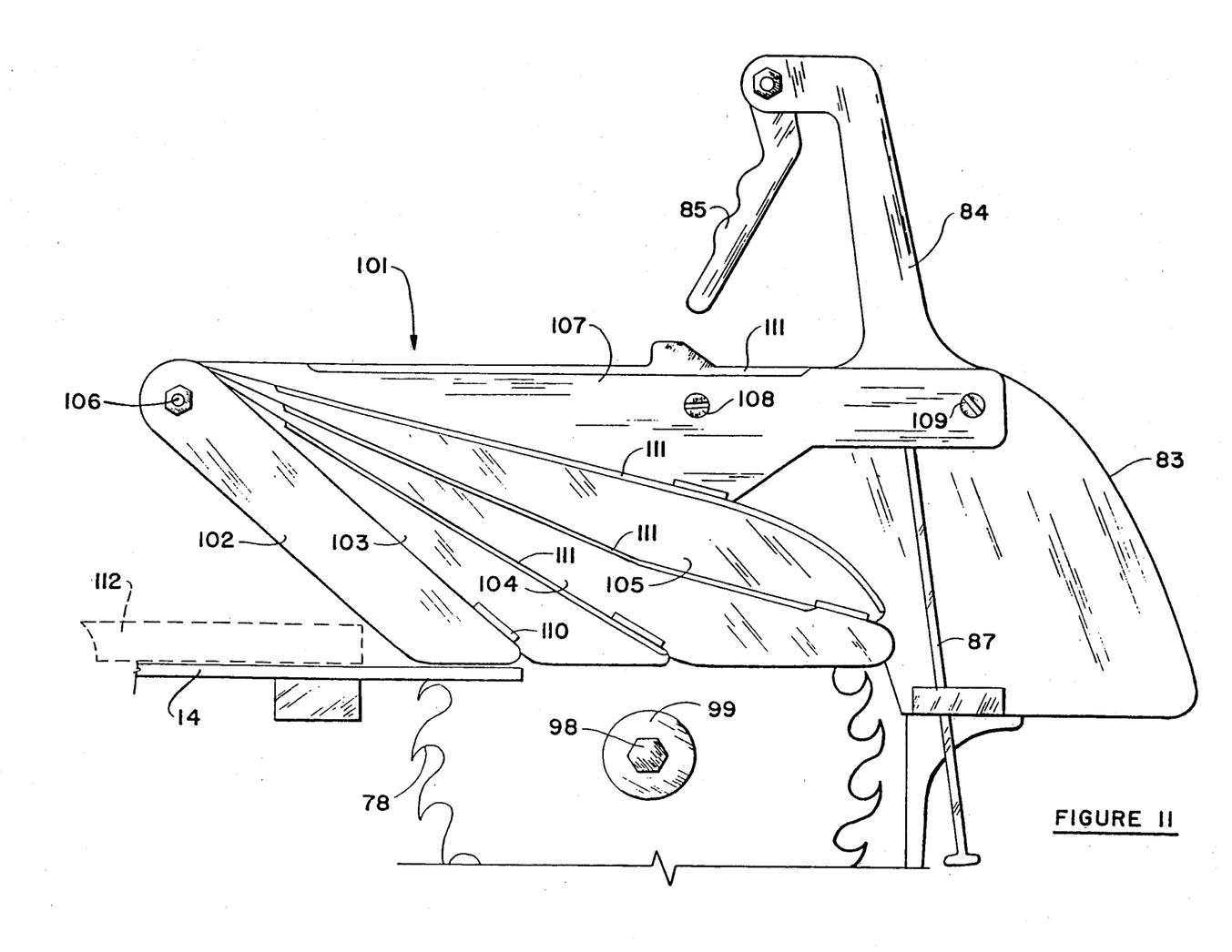
FIG. 11 is a side view of the leaf guard body utilized to protect the upper portion of the saw blade.

As shown in FIGS. 7, 8 and 11, blade guard assembly 81 is provided having a vertical mounted trigger assembly 82, comprising mounting plate 83 with trigger guard plates 84 to which trigger 85 is pivotally mounted by screw 86. Trigger 85 is attached to guard plates 84 by means of extension rod assembly 87 and in turn to connecting bracket 94 which is attached to mount 80, pivotally connecting members 88-93, pulley assembly 95 and springs 96 and 97 as shown in FIG. 7. When trigger 85 is squeezed, the blade guard is lifted to expose blade 78 to the piece of lumber being cut. Blade 78 is attached to saw 2 in conventional fashion by threaded bolt 98 and washer 99.

As shown seen in FIG. 11, an upper blade guard assembly 101 has sheaves 102-105 cantilevered about pin 106 attached to guard brace member 107 rigidly attached by bolts 108 and 109 to mounting plate 83. Each sheave is provided with a stop member 110 that strikes the protruding lip 111 of the sheave above it and causes the next sheave to rise. Starting with sheave 102, each one in succeeding order will be raised as the piece of lumber 112 strikes the lower portion of the sheave.

Figure 9:
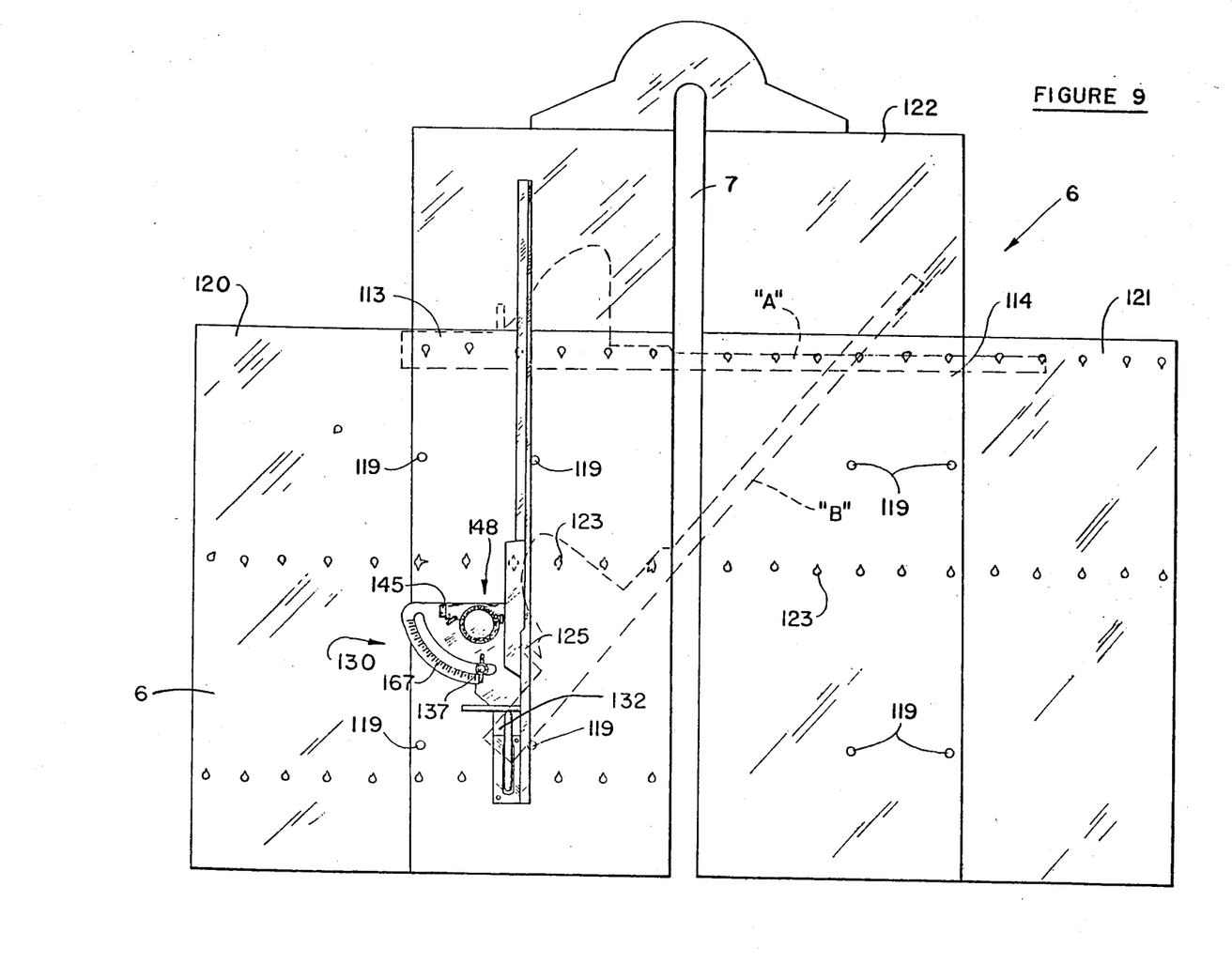
FIG. 9 is a top view of the table top illustrating the miter-rip fence positioning openings and positioning of the miter-rip fence thereon.

FIGS. 1 and 9 illustrate table top 6 which comprises base plates 113 and 114, which is attached to frame end wall foot plates 115-118 (see FIGS. 1, 3 and 9) by bolts 119. Side extension plates 120 and 121 can be attached to plates 113 and 114, respectively, as as well as back extension plate 122.

Both plates 113 and 114 are provided with locking guide holes 123 for positioning the miter-rip assembly 124.

Figure 10:
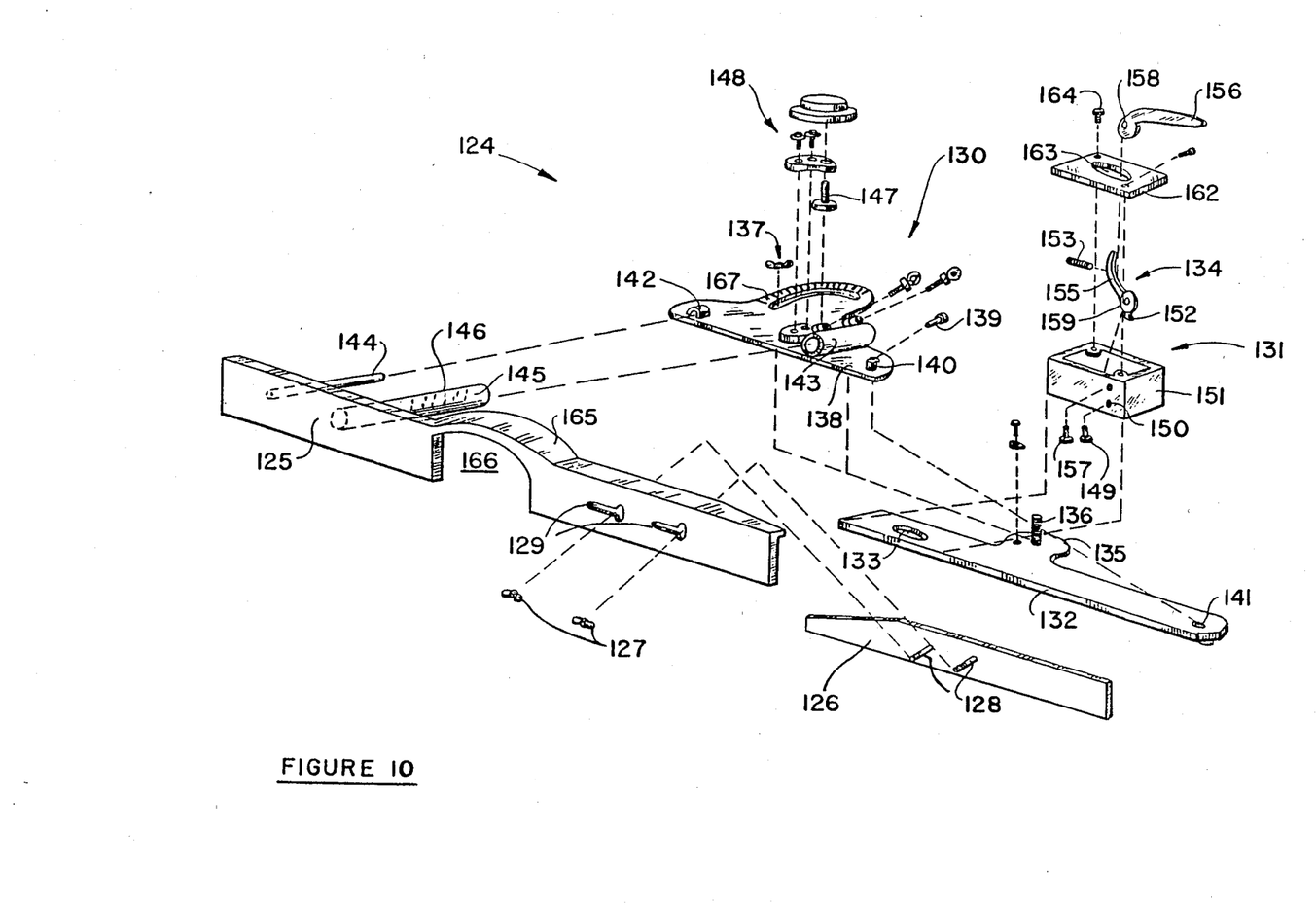
FIG. 10 is an exploded, perspective view of the miter-rip fence positioning adjusting assembly and table locking assembly.

Turning now to FIG. 10, miter-rip fence assembly 124 is shown, which comprises fence 125 with extension member 126 adjustably attached by tightening wing nuts 127 on threaded studs 128 projecting through slots 129, angle adjustment assembly 130 and locking foot assembly 131.

Angle adjustment assembly 130 is attached to base plate 132, which rests flat on table top 6 and is provided with locking foot opening 133, through which locking foot 152 can pass. Plate 132 is also provided with side piece 135 with threaded pin 136 for miter gauge wing nut 137 to screw into for holding miter gauge adjustment part 167 steady. Fitting on top of plate 132 is angle indicator plate 138 so that it pivots about pin 139, which passes through hollow stud 140 and opening 141 of table plate 132. Angle indicator plate 138 is provided with channel guide means 142 and 143, through which guide rods 144 and 145, respectively, extend. Rod 145 is provided with gear teeth 146 which are only on one side of rod 145 and which are operatively mating with gear 147 of conventional gear assembly 148.

Figure 13:
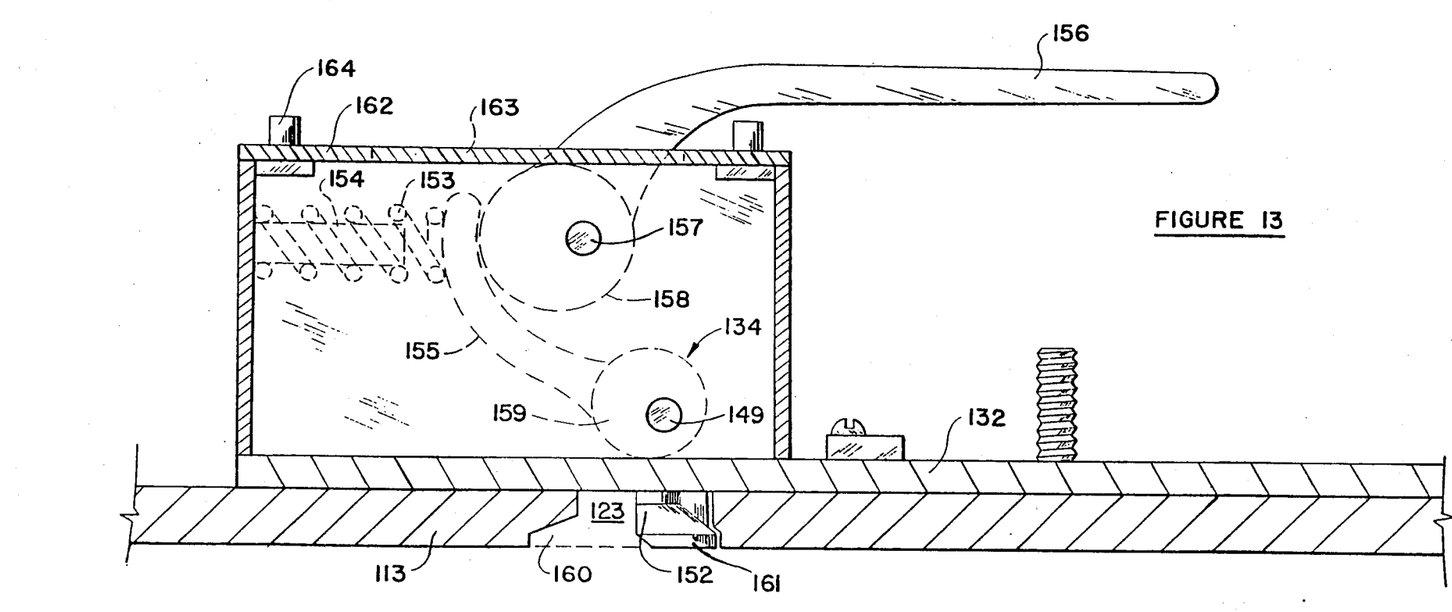
FIG. 13 is a side view of the miter-rip fence locking feet positioned in the table top positioning opening.

Locking foot assembly 131, as seen in FIGS. 10 and 13, comprises locking foot 134, which pivots about pin 149 that extends through opening 150 of box 151, which is welded atop plate 132, as shown. Opening 150 is positioned so that foot member 152 protrudes below plate 132 and into locking guide holes 123 of either plate 113, 114, 120, or 121. Spring 153 is positioned on box stud 154 and protrudes to contact and exert pressure against curved handle 155 of locking foot 134. Locking arm 156 pivots about pin 157 and has cam head 158, which contacts handle 155, forcing it against spring 153 when locking arm 156 is rotated downward. Because both cam head 158 and locking foot head 159 are positioned off-center about pins 149 and 157, respectively, locking foot 134 is fixed in position when locking arm 156 has been rotated downward.

As shown in FIG. 13, locking; guide hole 123 is provided with indented area 160 to matingly accommodate the toe 161 of foot member 152 when locking arm 156 has been rotated downward. In this manner, miter-rip fence assembly 124 is held firmly in position on table top 6. By providing numerous holes 123, fence assembly 124 can be firmly positioned in almost any desired position.

Box cover 162, having locking arm opening 163, is attached to box 151 by bolts 164 to allow easy access to the locking foot and locking arm for repairs and maintenance.

As shown in FIG. 10, fence 125 is provided with a raised section 165 having an opening 166 that is positioned over table top channel 7 when fence 125 is being used for cross-cutting. This position is illustrated at "A" in FIG. 9. In this embodiment, opening 166 is high enough to allow saw blade 78 to pass underneath during the cutting operation. The same is true when fence 125 is in position "B".

Figure 12:
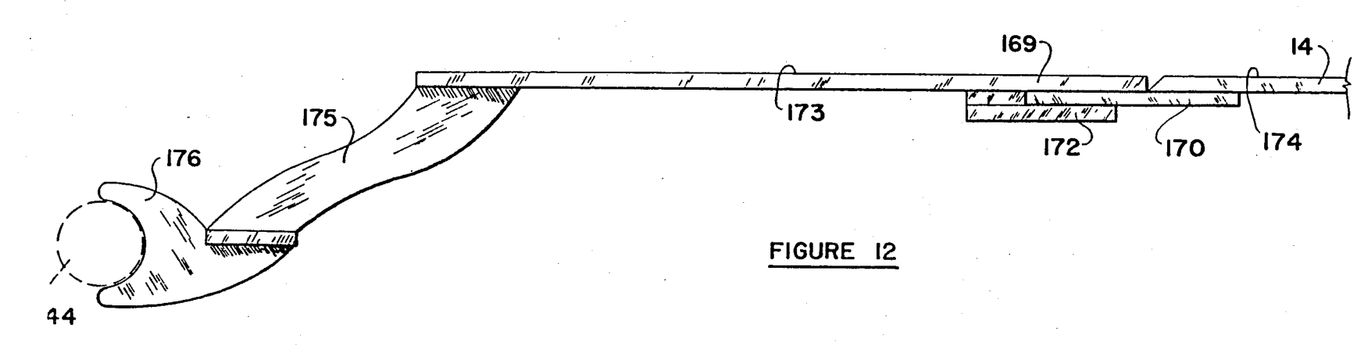
FIG. 12 is a side view of the material rest shoe extension mountable to the track and material rest shoe.

FIG. 12 illustrates a material rest extension 168 having end 169 fitting over material rest tongue 170. Tongue 170 is provided with slot 171 (see FIG. 8) that fits about mating bottom tongue 172 to form a rigid structure having a flat surface formed by the top surfaces 173 and 174 of material rest extension 168 and material rest shoe 14, respectively. To further hold material rest extension 168 in rigid position, extension arm 175 extends downward and is provided with cupped section 176 that abuts against back bar 44 of track assembly 4. This material rest extension 168 is used when saw 2 is to be fixed in position and the lumber moved across the blade such as in a ripping operation.

Thus, as is clear from the above descriptions of the invention, fence assembly 124 can be used as a rip fence, as a stop fence or as a miter gauge, resulting in a multiple purpose saw that can operate on many different sizes of lumber.

There are, of course, alternate embodiments not specifically described but which are intended to be within the scope of this invention as defined by the following claims.

What I claim is:

1. In a table saw of the type having a frame structure and a table top attached to said frame structure including an elongate channel extending therethrough adapted to receive a circular saw blade, the improvement comprising:
    a saw motor having a saw blade positioned to extend upwardly through said channel;
    a carriage assembly supporting said motor for pivotal movement relative thereto; and
    a track assembly supporting said carriage assembly for slidable movement relative thereto in a direction parallel to said channel, said track assembly being mounted on said frame structure for slidable movement relative thereto in a direction parallel to said channel such that said track assembly may be displaced relative to said frame structure so that an end of said track assembly protrudes from said frame assembly, and said carriage assembly may be displaced relative to said frame assembly such that said blade is positioned sidewardly beyond said table.

2. The table saw of claim 1 further comprising track assembly centering means.

3. The table saw of claim 2 wherein said centering means comprises a spool rotatably attached to said frame structure; a line attached at one end to said track assembly and having an opposite end portion coiled about said spool; and means biasing said spool to rotate, thereby coiling said line thereabout, such that said track assembly is moved from a displaced position to a predetermined position relative to said table top.

4. The table saw of claim 3 further comprising first detent means for releasably locking said track assembly to said frame structure; and second detent means for releaseably locking said carriage assembly to said track assembly.

5. In a table saw of the type having a frame structure and a table top attached to said frame structure including an elongate channel extending therethrough adapted to receive a circular saw blade, the improvement comprising:
    a saw motor having a saw blade positioned to extend upwardly through said channel;
    a carriage assembly supporting said motor for pivotal movement relative thereto;
    a track assembly mounted on said frame structure and supporting said carriage assembly, said track assembly being slidably mounted on said frame structure for rectilinear movement relative thereto in a direction parallel to said channel; and
    said carriage assembly being slidably mounted on said track assembly for rectilinear movement relative thereto in a direction parallel to said channel.

6. The table saw of claim 5 further comprising means mounted on said carriage assembly for adjusting an elevation of said saw motor relative to said table top independently of said track assembly.

* * * * *